(12) United States Patent
Strope (10) Patent No.: US 7,540,135 B2
(45) Date of Patent: Jun. 2, 2009

(54) MOWER DECK HEIGHT ADJUSTMENT

(76) Inventor: Claude Strope, 1520 N. 19th St., Nebraska City, NE (US) 68410

( * ) Notice: Subject to any disclaimer, the term of this patent is extended or adjusted under 35 U.S.C. 154(b) by 665 days.

(21) Appl. No.: 11/180,372

(22) Filed: Jul. 13, 2005

(65) Prior Publication Data

US 2007/0012016 A1    Jan. 18, 2007

(51) Int. Cl.
*A01D 34/00* (2006.01)
(52) U.S. Cl. .......................... 56/17.1; 56/14.9
(58) Field of Classification Search ............... 56/14.9, 56/17.1, 320.1, DIG. 22
See application file for complete search history.

(56) References Cited

U.S. PATENT DOCUMENTS

| | | | |
|---|---|---|---|
| 2,848,859 A | 8/1958 | Abel | |
| 3,512,344 A | 5/1970 | Kortum | |
| 4,840,020 A | 6/1989 | Oka | |
| 5,138,825 A | 8/1992 | Trefz et al. | |
| 5,351,467 A | 10/1994 | Trefz et al. | |
| 5,381,648 A | 1/1995 | Seegert et al. | |
| 5,526,633 A | 6/1996 | Strong et al. | |
| 5,697,455 A | 12/1997 | Deckler | |
| 5,784,870 A | 7/1998 | Seegert et al. | |
| 5,797,252 A | 8/1998 | Goman | |
| 5,816,033 A | 10/1998 | Busboom et al. | |
| 5,867,970 A | 2/1999 | Ehrhart et al. | |
| 6,041,584 A | 3/2000 | Hohnl | |
| 6,412,258 B1 | 7/2002 | Doerflinger | |
| 6,494,028 B2 | 12/2002 | Moore | |
| 6,837,032 B1 * | 1/2005 | Swartzendruber et al. | 56/14.9 |
| 7,063,177 B1 * | 6/2006 | Crumly | 180/6.48 |
| 2007/0028577 A1 * | 2/2007 | Clement et al. | 56/17.2 |

* cited by examiner

*Primary Examiner*—Alicia M Torres
(74) *Attorney, Agent, or Firm*—Dicke, Billig & Czaja, PLLC (57) ABSTRACT

A riding mower with a height adjustable mowing deck includes an operator seating area and a cam wheel rotatably connected to a frame of the mower adjacent to the operator seating area. The mowing deck is supported below the frame of the mower by a deck lifting system comprising a plurality of cooperating bell cranks pivotally connected at various locations to the frame. One of the bell cranks is connected for common rotation to a secondary arm aligned in a common plane with the cam wheel. A rod pivotally connects at one end to the secondary arm. The opposite end of the arm contacts an edge portion of the cam wheel. A selector wheel associated with the cam wheel, for adjusting the cam wheel edge in contact with the rod, has a scalloped perimeter edge. A detent engages the scalloped edge to maintain a selected position of the cam wheel.

24 Claims, 8 Drawing Sheets

MOWER DECK HEIGHT ADJUSTMENT

CROSS-REFERENCE TO RELATED APPLICATION(S)

None.

BACKGROUND OF THE INVENTION

The present invention relates to riding mowers with mechanisms for adjusting the deck height, more particularly, a deck height adjustment that is easily operable while the operator is sitting on the riding mower.

Riding mowers are used for cutting grass or other vegetation. Riding mowers vary in both size and design, but commonly include one or more cutting blades that are carried in an enclosure called a mowing deck. By adjusting the distance of the mowing deck relative to the ground, also called deck height, the mowing length of the grass is varied.

There remains a continuing need in the art for a deck height adjustment that can be performed quickly, easily and accurately by an operator of a riding mower without the need to shut down the motor of the mower and/or to dismount the mower.

BRIEF SUMMARY OF THE INVENTION

The present invention relates to a deck height adjusting apparatus for a riding mower having an operator seating area and a height adjustable mowing deck supported beneath a frame of the mower by a deck lifting system. The deck lifting system comprises a plurality of lift arms pivotally mounted to the mower frame and actuatable by an operator seated in the operator seating area to raise and lower the mowing deck. The deck height adjusting apparatus comprises a secondary arm spaced from and pivotally connected to one of the plurality of lift arms for common pivotal movement therewith. A cam wheel having a central spindle is rotationally mounted to the frame adjacent to the operator seating area. The cam wheel has first and second side surfaces and an edge surface. The edge surface is oriented in a common plane with the secondary arm. A rod has a first end pivotally attached to the secondary arm and a second end opposite the first end. The second end of the rod contacts the edge surface of the cam wheel when the secondary arm is in a first position. The second end of the rod is spaced from the edge of the cam when the secondary arm is in a second position.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale as it has been necessary to enlarge certain portions for clarity.

DETAILED DESCRIPTION

Figure 1:
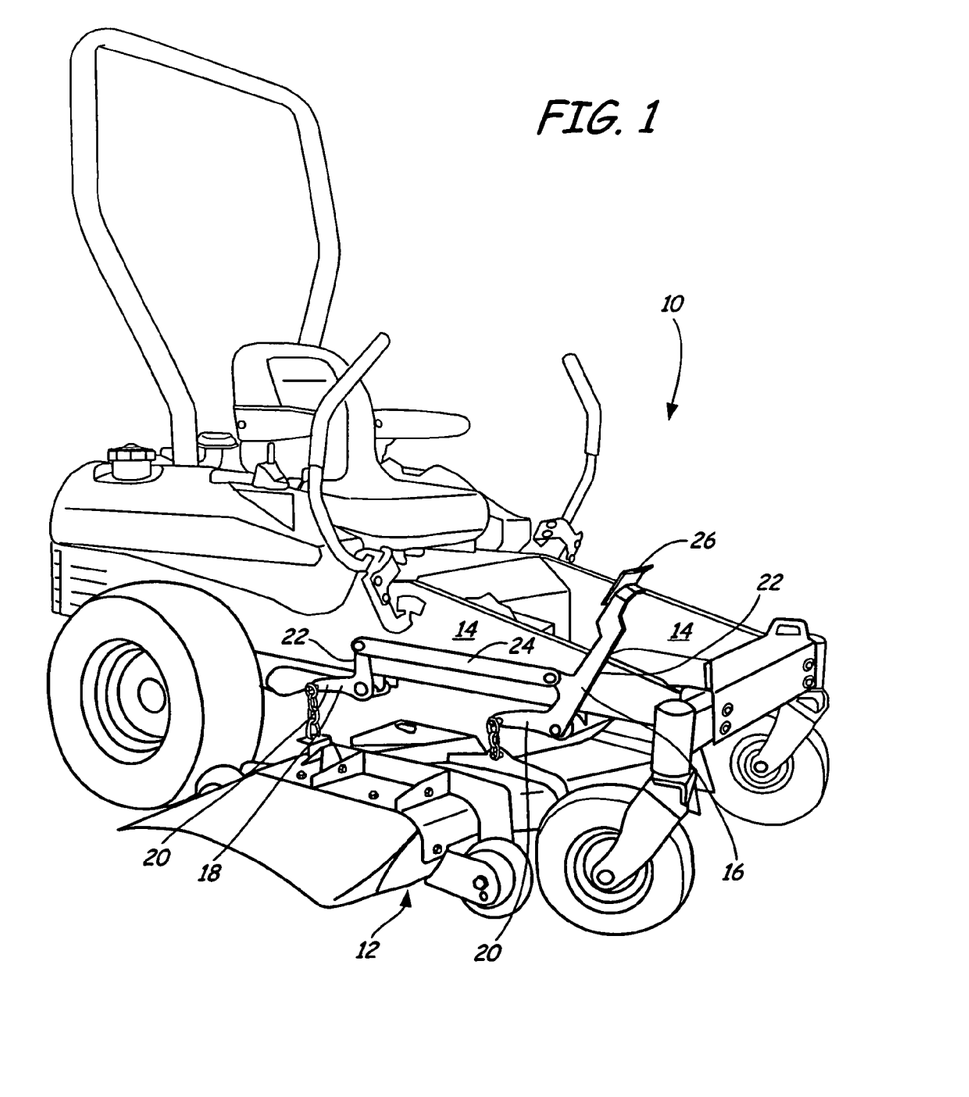
FIG. 1 is a perspective view of a riding lawn mower with a height-adjustable mowing deck.

The present invention is a deck height adjustment particularly useful for riding lawn mowers having a lever-actuated mowing deck lift system. FIG. 1 is a perspective view of a riding lawn mower 10 of the type having a height-adjustable mowing deck 12 supported below a frame 14. Mower 10 includes right front and rear lift arms 16 and 18, respectively, which are spaced along and pivotally mounted to frame 14 and are connected to mowing deck 12, such as by means of chain, cable, etc. As shown in FIG. 1, in one embodiment each lift arm 16, 18 is a bell crank of a type that includes a first portion 20, which extends generally horizontally in FIG. 1 and is connected at an end portion to the chain, and a second portion 22 that extends at an angle relative to the first portion 20, with a pivot point defined at the intersection of the first and second portions 20, 22. The second portions 22 of each lift arm 16 and 18 are linked together, such as by a bar 24, for coordinated movement of arms 16 and 18. As further shown in FIG. 1, the second portion 22 of front lift arm 16 has a length greater than that of the second portion of rear lift arm 18 and is provided with a foot peg or pad 26 at the free end.

The front lift arm 16 is located on frame 14 to permit second portion 22 to function as a lever accessible to the foot of an operator seated in the operator seating area 28. Mowing deck 12 is raised and lowered by the operator applying/releasing force on the foot pad 26, thereby causing a coordinated rotation of lift arms 16, 18 in either a clockwise direction or a counter-clockwise direction. As depicted in FIG. 1, the second portion 22 of the front lift arm 20 is in a home position, i.e., a rear-most range of travel, and the mowing deck 12 is in first lowered position. The present invention is a deck height adjustment that varies the home position of the front lift arm 16 and consequently sets the height of mowing deck 12 relative to the ground.

Figure 2:
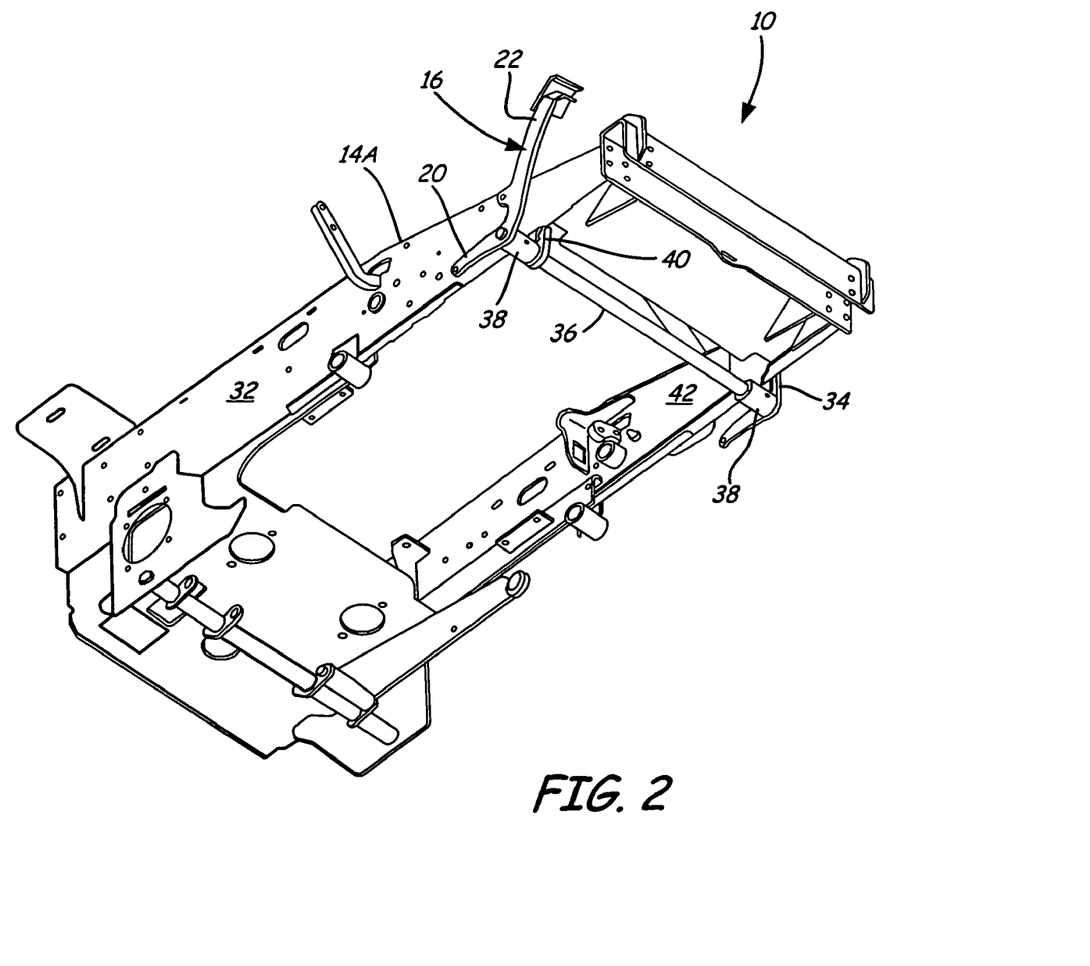
FIG. 2 is a bottom perspective view of the right side of a frame of the riding lawn mower of FIG. 1.

FIG. 2 is a bottom perspective view of the right side of frame 14 of the mower 10. As shown in FIG. 2, front lift arm 16 is located adjacent outer frame surface 32 of right frame portion 14A. In one embodiment lift arm 16 is connected to a left front lift arm 34 on the left side of frame 14 via a lift axle 36. One embodiment of a pivotal connection of lift arms 16 and 34 to frame 14 is accomplished by front pivot sleeves 38 connected to a lower portion of frame 14. Pivot sleeves 38 receive lift axle 36 for rotational movement of lift axle 36 when front lift arm 16 is pivotally actuated by the operator of mower 10. Associated with lift axle 36 spaced from and near front lift arm 16 is a secondary arm 40. Secondary arm 40 is located on lift axle 36 so as to be positioned adjacent an inner frame surface 42 of right frame portion 14A. Secondary arm 40 is secured to lift axle 36 and is oriented to be generally parallel with the second portion 22 of lift arm 16. Secondary arm 40 thereby rotates in concert with rotation of lift arm 16. Secondary arm 40 is further associated with a deck height adjustment assembly of the present invention as will be described in greater detail.

Figure 3:
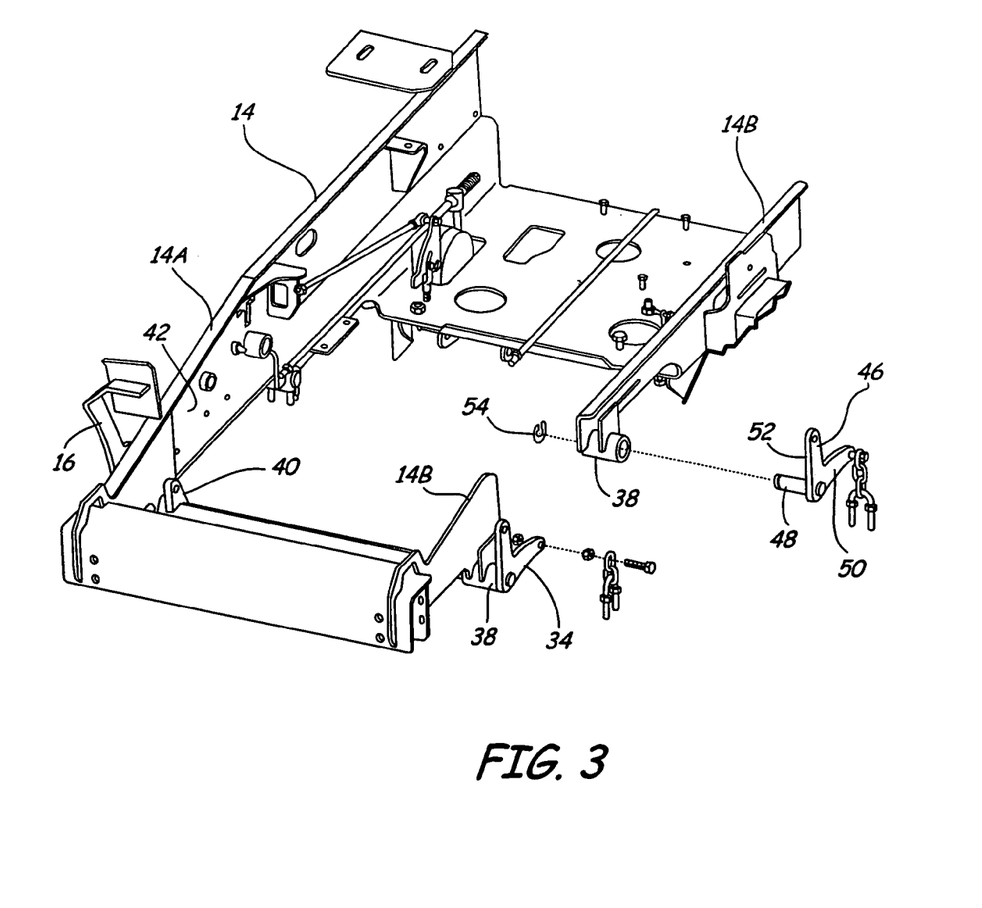
FIG. 3 is a partially exploded top perspective view of the left side of the frame of FIG. 2.

FIG. 3 is a partially exploded top perspective view of frame 14 with a section of left frame portion 14B cut away. As shown in FIG. 3, the left rear lift arm 46, which is configured like right rear lift arm 18, includes a pivot post 48 that is secured to and extends generally normal to the first and second portions 50 and 52, respectively, of lift arm 46. Pivot post 48 has an outer diameter that closely fits within an inner diameter of pivot sleeve 38 and a length sufficient to extend through pivot sleeve 38. An end portion of pivot post 48 is configured with a circumferential groove that receives a C-clip 54 to secure lift arm 46 relative to pivot sleeve 38. In an alternate embodiment, the left rear lift arm 46 can be pivotally connected to the right rear lift arm 18 via an axle.

Figure 4:
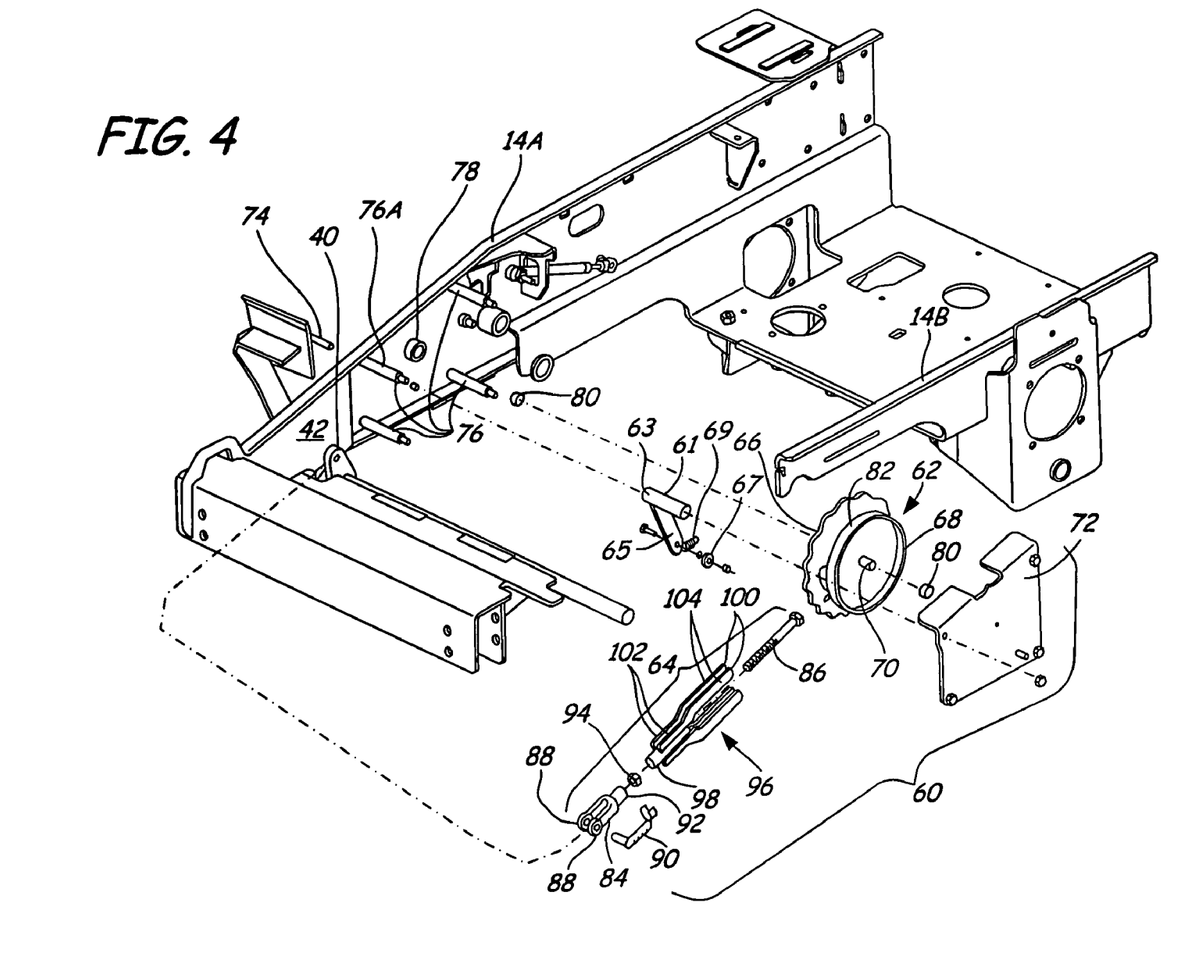
FIG. 4 is a partially exploded top perspective view of the frame of FIG. 3 with an exploded view of a deck height adjustment of the present invention.

FIG. 4 is a partially exploded top perspective view of frame 14 with frame portion 14B cut away to show the deck height adjustment assembly 60 of the present invention. Deck height adjustment assembly 60 is generally comprised of a cam wheel assembly 62 and a deck height link assembly 64, which interfaces with the secondary arm 40 and the cam wheel assembly 62 to maintain a mowing deck height determined by a setting of the cam wheel assembly 62. In one exemplary embodiment as shown in FIG. 4, the cam wheel assembly comprises a selector wheel 66 and a deck height indicator wheel 68 that are fixed in a spaced relationship on a common spindle 70 that extends from opposite sides of the cam wheel assembly 62. Cam wheel assembly 62 is mounted for rotation between right frame portion 14A and a cover plate 72 that secures to right frame portion 14A by a plurality of bolts 74 and spacers 76. In one embodiment, the rotational connection of cam wheel assembly 62 is provided by cup-like recesses 78 secured to the inner frame surface 42 of frame portion 14A to the inner surface of cover plate 72 (not shown). Cup-like recesses 78 receive pivot bushings 80, which are in turn sized to receive the spindle 70 therein.

Selector wheel 66 is provided with a scalloped edge to facilitate manual rotation of the cam wheel assembly 62 by an operator. The scalloped edge further functions to engage a detent 61. Detent 61 may be formed in any known manner, but in one exemplary embodiment is comprised of a sleeve 63 and an arm 65 that is secured to and radially extending from one end of sleeve 63. Secured to the free end of arm 65 with a nut and bolt is a bearing 67. Sleeve 61 is sized to fit over spacer 76A and be positioned such that the bearing 67 engages the scalloped edge of selector wheel 66. A spring 69 or other biasing device connects between the free end of arm 65 and the frame to bias the bearing 67 against a depressed portion of the scalloped edge of selector wheel 66 and thereby maintain a selected position of the selector wheel 66.

Deck height indicator wheel 68 includes a circumferential face 82 that is marked with indicia representative of a deck height selection. Positioned between the selector wheel 66 and the deck height indicator wheel 68 is a cam wheel that interacts with the deck height link assembly 64 to define a given height of mowing deck 12 in a manner to be described more fully herein.

Deck height link assembly 64 in its essence comprises a U-shaped connector 84 and a threaded rod 86 that connects to the U-shaped connector 84. The U-shaped connector 84 has first and second spaced legs 88, each of which has an opening at a free end of the respective leg 88. Legs 88 are spaced to receive the free end of secondary arm 40 therebetween. U-shaped connector 84 is pivotally connected to secondary arm 40 by passing a pin connector 90 through the leg openings and an opening in secondary arm 40. U-shaped connector 84 further includes a cylindrical head 92 opposite the leg openings, which is provided with internal threads to receive the threaded rod 86. A lock nut 94 threaded on rod 86 is provided to maintain a given position of rod 86 relative to the U-shaped connector 84.

In one embodiment, deck height link assembly 64 is further provided with a guide assembly 96, which assists in maintaining proper alignment of rod 86 with cam wheel assembly 62. In one embodiment, guide assembly 96 comprises a metal tube 98 and a plurality of metal fingers 100 each having a first portion 102 connected to tube 98, such as by welding, and a second portion 104 extending longitudinally from tube 98. As oriented in FIG. 4, fingers 100 are arranged in two sets that are diametrically arranged on tube 98, each set comprising two spaced and generally parallel fingers 100.

Figure 5:
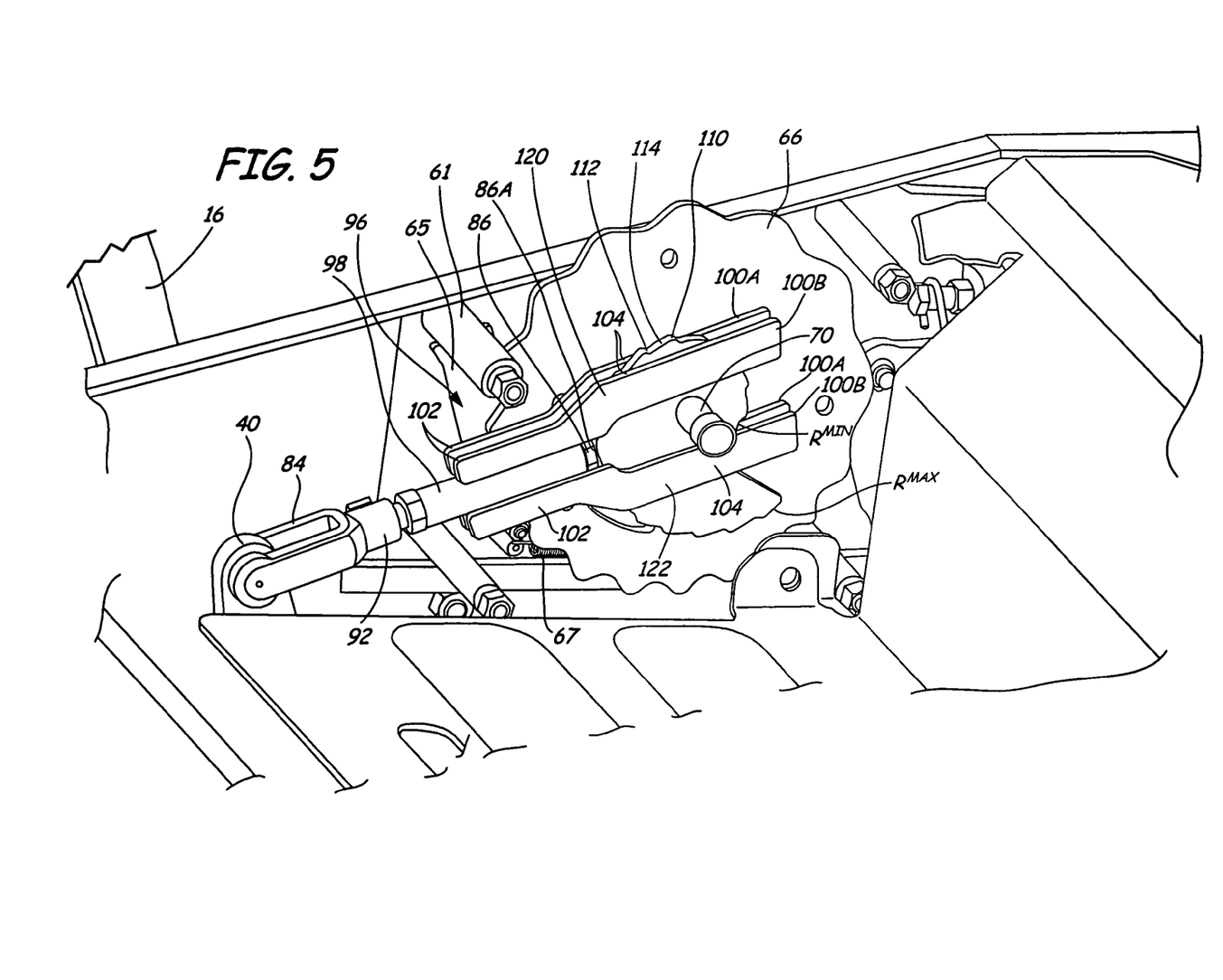
FIG. 5 is an enlarged perspective view of the deck height adjustment of the present invention with a cover plate removed.

FIG. 5 is an enlarged perspective view of the assembled deck height adjustment assembly 60 of the present invention with the deck height indicator wheel 68 and cover plate 72 removed. As shown in FIG. 5, positioned between selector wheel 66 and the deck height indicator wheel 68 is a cam wheel 110, which has an outer edge of varying radius relative to the axis of rotation defined by spindle 70. The edge of cam wheel 110 at point $R^{min}$ defines the minimum radius of cam wheel 110, while the edge of cam wheel 110 at point $R^{max}$ defines the maximum radius of cam wheel 110. The edge of cam wheel 110 is defined by graduated steps each defined by a shoulder portion 112 and a ramped portion 114. The edge of cam wheel 110 is oriented to align with the head of rod 86 such that when lift arm 16 is in the home position (and consequently when the secondary arm 40 is in the home position), rod 86 contacts an edge portion of cam wheel 110 thereby supporting deck 12 at a given height above the ground. The steps defined in the edge of cam wheel 110 serve to positively register rod 86 with the cam edge portion selected for engagement with rod 86.

The height of deck 12 is a function of the portion of the cam wheel edge selected to be in contact with rod 86, with the point defined by $R^{min}$ representing the lowest deck height setting and the point defined by $R^{max}$ representing the highest deck height setting. Calibration of the actual deck height with the deck height indicator wheel 68 is accomplished by varying the distance of the head of rod 86 from the cylindrical head 92 of the U-shaped connector 84 (i.e., via the threadable connection of rod 86 with cylindrical head 92).

As further shown in FIG. 5, when guide assembly 96 is used in connection with the deck height adjustment of the present invention, rod 86 extends through tube 98 of guide assembly 96 before it is threaded into the cylindrical head 92 of U-shaped connector 84. Connected to tube 98 along top and bottom diametrically opposed outer surface portions of tube 98 are first and second pairs 120 and 122, respectively, of fingers 100. Each pair 120 and 122 comprises two fingers 100 supported in a spaced and generally parallel relationship with one another by a connection of the respective first portions 102 of each finger 100 with tube 98. So connected, portions 104 of fingers 100A of finger pairs 120 and 122 are sized to fit in a complimentary gap between cam wheel 110 and selector wheel 66, and cam wheel 110 is positioned between a complimentary space between portions 104 of fingers 100A, 100B. Similarly, portions 104 of fingers 100B of finger pairs 120 and 122 are sized to fit in a complimentary gap between cam wheel 110 and deck height indicator wheel 68.

Each finger pair 120, 122 fits in close slideable relationship with cam wheel 110 which aids in aligning the head 86A of rod 86 with the edge of cam wheel 110. The second portions 104 of fingers 100 have a length sufficient to remain in slideable engagement with cam wheel 110 when rod 86 is disengaged from cam wheel 110 (i.e., when front lift arm 16 is rotated away from the home position by the operator). The spacing of the second portions 104 of the first pair of fingers 120 relative to the second portions 104 of the second pair of fingers 122 is selected to align rod 86 in a first plane generally perpendicular to the edge of cam wheel 110, the facing edges of the second portion 104 of fingers 100 guided by the spindle 70 of the cam wheel assembly 62. As further shown in FIG. 5, arm 65 of detent 61 is positioned along side of selector wheel 66, with bearing 67 extending from arm 65 to engage the scalloped edge of selector wheel 66 in the manner previously described.

Figure 5A:
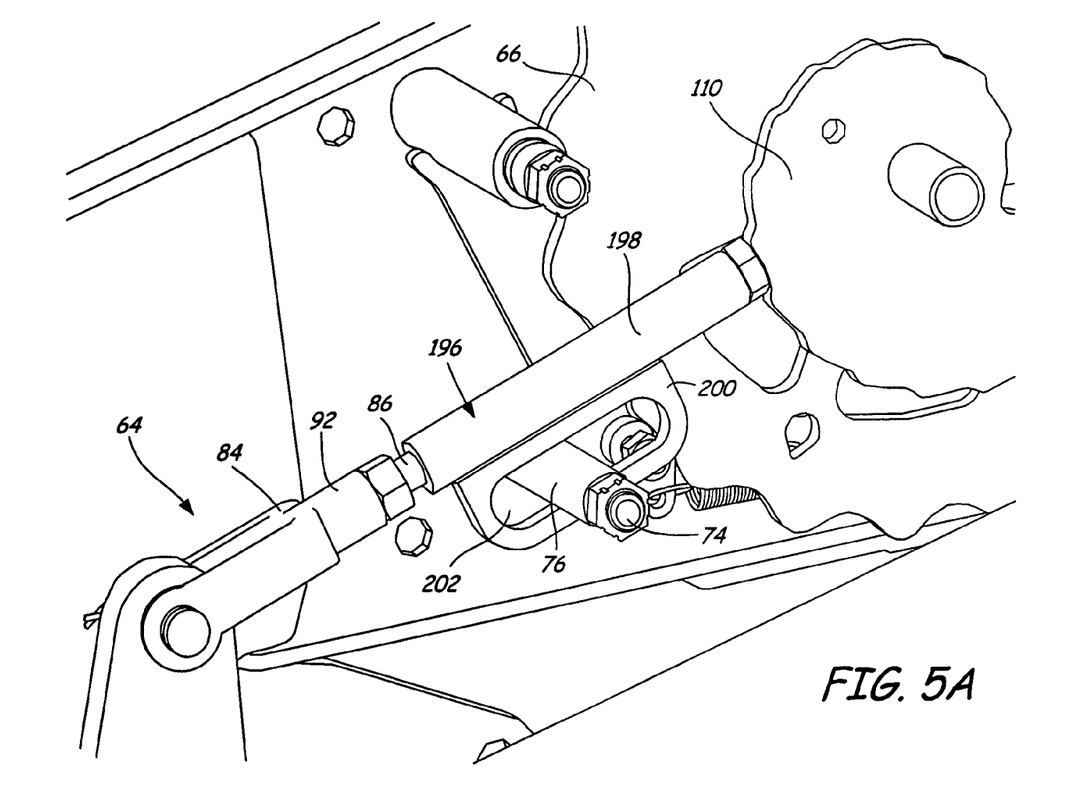
FIG. 5A is an enlarged perspective view of a first alternative embodiment of a guide mechanism of the deck height adjustment of the present invention.
Figure 5B:
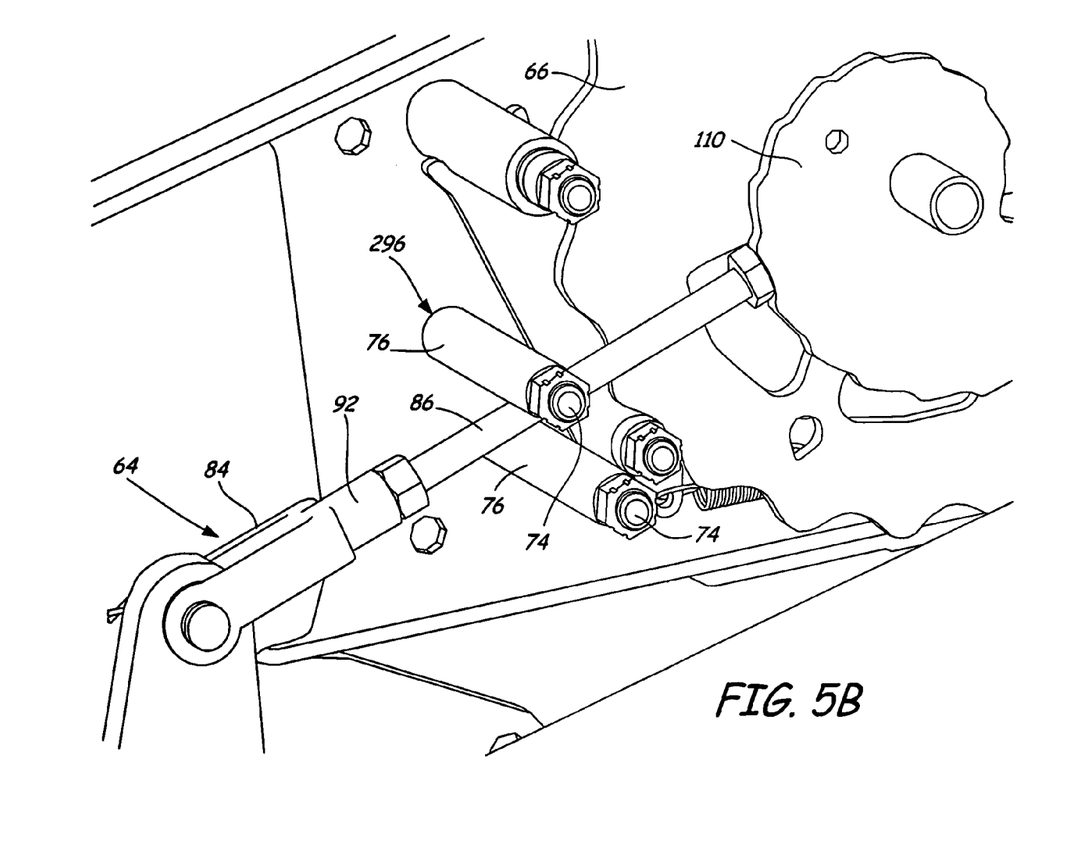
FIG. 5B is an enlarged perspective view of a second alternative embodiment of a guide mechanism of the deck height adjustment of the present invention.

Alternative embodiments of a guide assembly for rod 86 are shown in FIGS. 5A and 5B. As shown in FIG. 5A, guide assembly 196 comprises a metal tube 198 sized to receive rod 86 therethrough. Tube 198 has a length approximating the portion of rod 86 extending from the cylindrical head 92 of the U-shaped connector 84, with a sufficient length variance to permit fine adjustments of rod 86 to synchronize the actual deck height with the deck height indicator wheel (not shown). Connected to tube 198 is a metal flange 200 which is configured with an elongate opening 202. Opening 202 is sized to fit relative to a support extending from frame 14, which in one embodiment may be one of the nearby spacers 76 for cover plate 72. The size of flange 200 and length of opening 202 is selected to align rod 86 in the desired orientation in the first plane relative to cam wheel 110 and allow a range of movement of the deck height link assembly 64 for raising and lowering the mowing deck. Sandwiched between the deck height selector wheel 66 and the deck height indicator wheel 68, rod 86 remains centered on the edge of cam wheel 110.

Another alternative embodiment of guide assembly 296 is shown in FIG. 5B. As shown in FIG. 5B, guide assembly 296 comprises a pair of supports extending from frame 14, e.g., bolts 74 and spacers 76, which are oriented and spaced relative to one another to support rod 86 in the proper orientation in the first plane to contact the edge of cam wheel 110 and allow movement of the deck height link assembly 64. Other means for supporting and guiding rod 86 for proper alignment with cam wheel 110 will be apparent to those of ordinary skill in the art.

Figure 6:
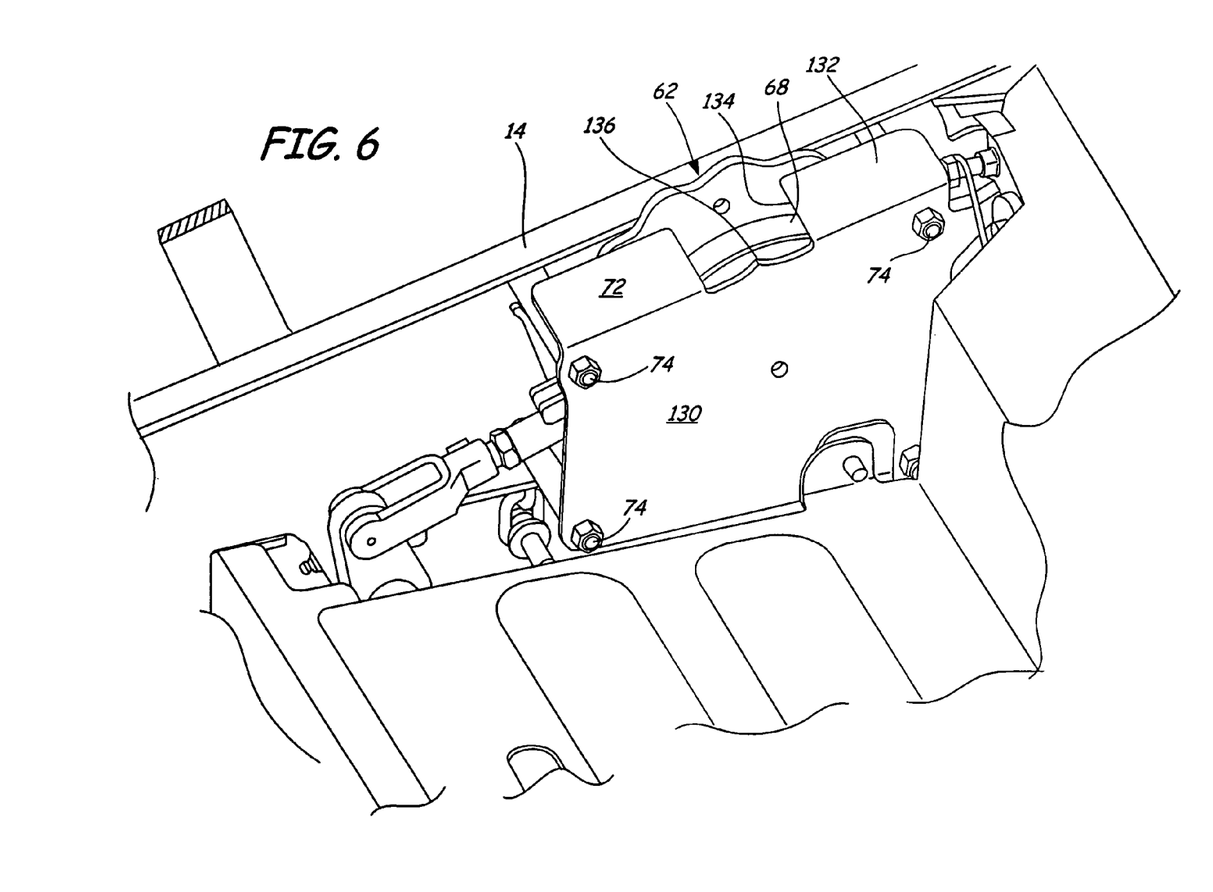
FIG. 6 is an enlarged perspective view of the deck height adjustment of the present invention covered by the cover plate.

FIG. 6 is an enlarged perspective view of the cam wheel assembly 62 and cover plate 72 mounted to frame 14. Cover plate 72 is comprised of a first metal portion 130 with holes formed therethrough to receive bolts 74 and a second metal portion 132 that extends generally normal to the first metal portion 130 to cover a top area of cam wheel assembly 62. The second metal portion 132 includes a cut-away area that defines a window 134 for viewing access to the deck height indicator wheel 68. Top edge 136 of the first metal portion 130 is formed to define an elevated point 136 centrally positioned relative to window 134. Central point 136 is used to align the deck height indicia marked on the deck height indicator wheel 68 with a desired deck height.

Referring again to FIG. 1, to adjust the height of mowing deck 12, an operator seated in the operator seating area 28 places a foot on the foot pad 26 and applies a pushing force to rotate the front lift arm 16 clockwise relative to the home position of arm 16, which raises mowing deck 12 relative to the ground. Consequently, the secondary arm 40 is rotated clockwise thereby moving rod 86 away from the edge of cam wheel 110. With the mowing deck in the raised position, the operator rotates the selector wheel 66 to the desired deck height setting, as displayed by the deck height indicator wheel 68. The operator then returns the front arm 16 (and thus secondary arm 40) to the home position until the head of rod 86 contacts the edge of cam wheel 110. It is to be appreciated that secondary arm 40 may replace lift arm 16 as a foot lever for actuating the lift arms by extending the length of the arm 40, in the manner described relative to second portion 22 of lift arm 16, in which case a foot pad is associated with a terminal end of secondary arm 40 and rod 86 pivotally connects generally at a midpoint of arm 40.

Although the present invention has been described with reference to preferred embodiments, workers skilled in the art will recognize that changes may be made in form and detail without departing from the spirit and scope of the invention.

The invention claimed is:

1. In a riding mower having an operator seating area and a height adjustable mowing deck supported beneath a frame of the mower by a deck lifting system comprising a plurality of lift arms pivotally mounted to the mower frame and actuatable by an operator seated in the operator seating area to raise and lower the mowing deck, a deck height adjusting apparatus comprising:

a secondary arm spaced from and pivotally connected to one of the plurality of lift arms for common pivotal movement therewith;

a cam wheel having a central spindle, the cam wheel rotationally mounted to the frame adjacent to the operator seating area, the cam having first and second side surfaces and an edge surface, the edge surface being oriented in a common plane with the secondary arm; and a rod having a first end pivotally attached to the secondary arm and a second end opposite the first end, wherein the second end of the rod contacts the edge surface of the cam when the secondary arm is in a first position, and wherein the second end of the rod is spaced from the edge of the cam when the secondary arm is in a second position; and wherein the one of the plurality of lift arms comprises a bell crank having a first portion connected to the mowing deck and a second portion extending at an angle relative to the first portion, the second portion having a length greater than the first portion, a terminal end of the second portion comprising a foot pad.

2. The deck height adjusting apparatus of claim 1 and further comprising: means for aligning the rod in a first plane for a generally perpendicular contact with the cam wheel edge.

3. The deck height adjusting apparatus of claim 2, wherein the means for aligning comprises:

a tube having a first end and a second end, the tube being positionable over the rod between the first and second ends of the rod;

a first set of fingers on a first side of the tube and a second set of fingers on a second side of the tube, the first and second sets of fingers extending beyond the second end of the arm, wherein the first and second sets of fingers engage the central spindle.

4. The deck height adjusting apparatus of claim 2 wherein the means for aligning comprises:

a first support extending from the frame;

a tube having a first end a second end and an outer surface, the tube being positionable over the rod between the first and second ends of the rod;

a flange connected to the outer surface of the tube and extending generally between the first and second ends of the rod, the flange configured with an elongate opening, wherein the first support extends through the elongate opening.

5. The deck height adjusting apparatus of claim 2 wherein the means for aligning comprises:
   a first support extending from the frame;
   a second support extending from the frame and spaced from the first support, wherein the first and second supports engage the rod to align the rod with the cam wheel edge in the first plane.

6. The deck height adjusting apparatus of claim 1 wherein the secondary arm comprises a terminal end configured with a foot pad.

7. The deck height adjusting apparatus of claim 1 and further comprising:
   a selector wheel mounted on the central spindle adjacent to the cam wheel for rotation of the cam wheel by the operator, the selector wheel having a scalloped perimeter edge; and
   a detent engaging the scalloped edge.

8. The deck height adjusting apparatus of claim 7 wherein the detent comprises:
   an arm pivotally mounted relative to the frame, the arm having a free end; and
   a bearing connected to the free end of the arm and engaging the scalloped edge of the selector wheel, the free end of the arm being biased toward the scalloped edge of the selector wheel.

9. In a riding mower having an operator seating area and a height adjustable mowing deck supported beneath a frame of the mower by a deck lifting system comprising a plurality of lift arms pivotally mounted to the mower frame and actuatable by an operator seated in the operator seating area to raise and lower the mowing deck, a deck height adjusting apparatus comprising:
   a secondary arm spaced from and pivotally connected to one of the plurality of lift arms for common pivotal movement therewith;
   a cam wheel having a central spindle, the cam wheel rotationally mounted to the frame adjacent to the operator seating area, the cam having first and
   second side surfaces and an edge surface, the edge surface being oriented in a common plane with the secondary arm;
   a rod having a first end pivotally attached to the secondary arm and a second end opposite the first end, wherein the second end of the rod contacts the edge surface of the cam when the secondary arm is in a first position, and wherein the second end of the rod is spaced from the edge of the cam when the secondary arm is in a second position;
   a selector wheel mounted on the central spindle adjacent to the cam wheel for rotation of the cam wheel by the operator, the selector wheel having a scalloped perimeter edge; and
   a detent engaging the scalloped edge.

10. The deck height adjusting apparatus of claim 9 and further comprising:
    means for aligning the rod in a first plane for at generally perpendicular contact with the cam wheel edge.

11. The deck height adjusting apparatus of claim 10, wherein the means for aligning comprises:
    a tube having a first end and a second end, the tube being positionable over the rod between the first and second ends of the rod;
    a first set of fingers on a first side of the tube and a second set of fingers on a second side of the tube, the first and second sets of fingers extending beyond the second end of the arm, wherein the first and second sets of fingers engage the central spindle.

12. The deck height adjusting apparatus of claim 10 wherein the means for aligning comprises:
    a first support extending from the frame;
    a tube having a first end a second end and an outer surface, the tube being positionable over the rod between the first and second ends of the rod;
    a flange connected to the outer surface of the tube and extending generally between the first and second ends of the rod, the flange configured with an elongate opening, wherein the first support extends through to elongate opening.

13. The deck height adjusting apparatus of claim 10 wherein the means for aligning comprises:
    a first support extending from the frame;
    a second support extending from the frame and spaced from the first support, wherein the first and second supports engage the rod to align the rod with the cam wheel edge in the first plane.

14. The deck height adjusting apparatus of claim 9 wherein the one of the plurality of lift arms comprises a bell crank having a first portion connected to the mowing deck and a second portion extending at an angle relative to the first portion, the second portion having a length greater than the first portion, a terminal end of the second portion comprising a foot pad.

15. The deck height adjusting apparatus of claim 9 wherein the secondary arm comprises a terminal end configured with a foot pad.

16. The deck height adjusting apparatus of claim 9 wherein the detent comprises:
    an arm pivotally mounted relative to the frame, the arm having a free end; and
    a bearing connected to the free end of the arm and engaging the scalloped edge of the selector wheel, the free end of the arm being biased toward the scalloped edge of the selector wheel.

17. A riding lawn mower having an operator seating area and a mowing deck, the riding lawn mower comprising:
    a frame;
    a plurality of lift arms pivotally connected to the frame, each of the plurality of lift arms connected to the mowing deck;
    a secondary arm rotatably connected to one of the plurality of lift arms for common rotation therewith, the secondary arm having a first length;
    a cam wheel rotatably connected to the frame adjacent to the operator seating area;
    a rod having a first end connected to the secondary arm and a second end, the second end engaging the edge of the cam wheel when the secondary arm is in a first position, the second end being spaced from the cam wheel edge when the secondary arm is in a second position, wherein the height of the mowing deck is a function of a cam wheel edge portion engaging the second end of the rod;
    means for actuating the plurality of lift arms to raise and lower the mowing deck; and
    wherein the means for actuating the plurality of lift wins comprises the one of the plurality of lift arms, the one of the plurality of lift arms comprising a bell crank having a first portion connected to the mowing deck and a second portion extending at an angle relative to the first portion, the second portion having a length greater than the first portion, a terminal end of the second portion comprising a foot pad.

18. The mower of claim 17 wherein the means for actuating the plurality of lift arms comprises a secondary arm extension contiguous with the secondary arm, the secondary arm extension having a second length, the secondary arm extension having a terminal end configured with a foot pad.

19. The deck height adjusting apparatus of claim 17 and further comprising:
a selector wheel rotatably connected to the frame adjacent to the cam wheel for common rotation with the cam wheel, the selector wheel having a scalloped perimeter edge; and
a detent engaging the scalloped edge.

20. The deck height adjusting apparatus of claim 19 wherein the detent comprises an arm pivotally mounted relative to the frame, the arm having a free end; and a bearing connected to the free end of the arm and engaging the scalloped edge of the selector wheel, the free end of the arm being biased toward the scalloped edge of the selector wheel.

21. A riding lawn mower having an operator seating area and a mowing deck, the riding lawn mower comprising:
a frame;
a plurality of lift arms pivotally connected to the frame, each of the plurality of lift arms connected to the mowing deck;
a secondary arm rotatably connected to one of the plurality of lift arms for common rotation therewith, the secondary arm having a first length;
a cam wheel rotatably connected to the frame adjacent to the operator seating area;
a rod having a first end connected to the secondary arm and a second end, the second end engaging the edge of the cam wheel when the secondary arm is in a first position, the second end being spaced from the cam wheel edge when the secondary arm is in a second position, wherein the height of the mowing deck is a function of a cam wheel edge portion engaging the second end of the rod;
means for actuating the plurality of lift arms to raise and lower the mowing deck;
a selector wheel rotatably connected to the frame adjacent to the cam wheel for common rotation with the cam wheel, the selector wheel having a scalloped perimeter edge; and
a detent engaging the scalloped edge.

22. The mower of claim 21 wherein the means for actuating the plurality of lift arms comprises a secondary arm extension contiguous with the secondary arm, the secondary arm extension having a second length, the secondary arm extension having a terminal end configured with a foot pad.

23. The mower of claim 21 wherein the means for actuating the plurality of lift arms comprises the one of the plurality of lift arms, the one of the plurality of lift arms comprising a bell crank having a first portion connected to the mowing deck and a second portion extending at an angle relative to the first portion, the second portion having a length greater than the first portion, a terminal end of the second portion comprising a foot pad.

24. The deck height adjusting apparatus of claim 21 wherein the detent comprises:
an arm pivotally mounted relative to the frame, the arm having a free end; and
a bearing connected to the free end of the arm and engaging the scalloped edge of the selector wheel, the free end of the arm being biased toward the scalloped edge of the selector wheel.

* * * * *